United States Patent

Pohlemann et al.

[15] 3,679,737
[45] July 25, 1972

[54] PRODUCTION OF ESTERS OF OMEGA-HYDROXYALKANESULFONIC ACIDS WITH ALKENOIC ACIDS

[72] Inventors: Heinz Pohlemann, Limburgerhof; Rolf Wurmb, Heidelberg, both of Germany

[73] Assignee: Badische Anilin- & Soda-Fabrik Aktiengesellschaft, Ludwigshafen/Rhine, Germany

[22] Filed: Nov. 25, 1969

[21] Appl. No.: 879,936

[30] Foreign Application Priority Data

Dec. 7, 1968  Germany..................P 18 13 364.7

[52] U.S. Cl..........................................260/486 R, 260/485 J
[51] Int. Cl..................................C07c 69/54, C07c 69/60
[58] Field of Search..................260/48 G, 48 R, 485 J, 486 R

[56] References Cited

UNITED STATES PATENTS 3,024,221   3/1962   Le Ferre et al. ....................260/486 X

FOREIGN PATENTS OR APPLICATIONS 1,042,719   9/1966   Great Britain.......................260/486

*Primary Examiner*—Lorraine A. Weinberger
*Assistant Examiner*—Paul J. Killos
*Attorney*—Johnston, Root, O'Keeffe, Keil, Thompson and Shurtleff

[57]   ABSTRACT

Production of ω-hydroxyalkanesulfonic/alkenoic acid esters by reaction of alkali metal or alkaline earth metal salts of alkenoic acids with sultones in the presence of alcohols at a temperature below 45° C. The products are starting materials for the production of fibers, detergents, wetting agents, dispersing agents, ion exchangers and plastics.

8 Claims, No Drawings

PRODUCTION OF ESTERS OF OMEGA-HYDROXYALKANESULFONIC ACIDS WITH ALKENOIC ACIDS

The invention relates to a process for the production of ω-hydroxyalkanesulfonic/alkenoic acid esters by reaction of alkali metal or alkaline earth metal salts of alkenoic acids with sultones in the presence of alcohols at a temperature below 45° C.

The reaction between alkali metal or alkaline earth metal salts of carboxylic acids and sultones which results in esters of hydroxyalkanesulfonic acids with opening of the sulfonic acid lactone ring is already known. U.S. Pat. Specification No. 2,964,557 discloses the reaction of methacrylates with sultones, advantageously in the presence of organic solvents, for example ethanol or benzene. The range from 70° to 145° C is given as the temperature range for the reaction. German Pat. Specification No. 894,116 describes similar reactions carried out in the presence of water without the addition of inert organic solvents and gives temperatures of from 80° C to 100° C in the Examples. The process disclosed in Belgian Pat. No. 593,819 is carried out at from 40° to 130° C in the presence of inert sulfoxides and sulfones which dissolve the salts of the carboxylic ester sulfonic acids formed. In all the Examples of the said Belgian patent reaction temperatures of at least 50° to 55° C are mentioned.

In all the said methods impure end products are obtained which can only be purified with difficulty and uneconomically and the yield of pure end product is unsatisfactory. When the end products are esters derived from polymerizable organic acids, for example acrylic or methacrylic acid, the use of high temperatures over long periods results in undesirable polymerizations and other secondary reactions in spite of the addition of stabilizers. The byproducts formed in turn (when the unsaturated esters containing sulfonate groups are to be used for polymerization purposes) contaminate the end product to be prepared by polymerization and thus impair its properties.

It is an object of the invention to provide a new process for the production of esters of ω-hydroxyalkanesulfonic acids which is easier to carry out and more economical and gives better yields and higher purity.

These and other objects of the invention are achieved and ω-hydroxyalkanesulfonic/alkenoic acid esters are prepared more advantageously in the reaction of alkali metal or alkaline earth metal salts of alkenoic acids with sultones in the presence of organic solvents by carrying out the reaction in the presence of an alcohol at a temperature of less than 45° C.

When sodium methacrylate and 1,3-propanesultone are used, the reaction may be represented by the following equation:

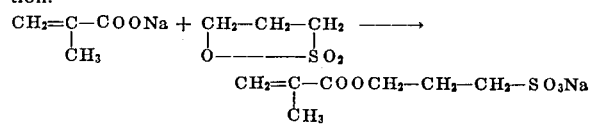

As compared with prior art methods, the process according to this invention gives ω-hydroxyalkanesulfonic/alkenoic acid esters in better yields and higher purity in a simpler and more economical manner. Having regard to the state of the art it is surprising that these results should be achieved at low temperature and in the presence of alcohols which are reactive as compared with other organic solvents without appreciable formation of byproducts. Because of their purity, the polymerizable esters prepared by the process according to this invention facilitate polymerization and make possible the production of pure polymers.

Alkali metal and alkaline earth metal salts, particularly lithium, sodium, potassium, calcium and magnesium salts of alkenoic acids, especially polymerizable α,β-alkenoic acids, are used as starting materials. Preferred alkenoic acids are linear or branched monocarboxylic or dicarboxylic acids having three to six carbon atoms, for example acrylic acid, methacrylic acid, maleic acid, fumaric acid, crotonic acid, citraconic acid, mesaconic acid, angelic acid and tiglic acid. Instead of salts of alkenoic acids, substances which form the same during the reaction, for example the corresponding alkenoic acids and the corresponding alkali metal or alkaline earth metal hydroxides or alcoholates, may be used. In an advantageous embodiment of the process, alcoholates are employed so that alcohol formed during the reaction serves as solvent to be used according to the invention and less alcohol, or none at all, needs to be added. Alkali metal alkanolates, for example lithium methylate, sodium methylate and potassium ethylate are particularly suitable as alcoholates. ω-alkanesultones, preferably linear sultones having three to six carbon atoms, may also be used as starting materials. Examples of suitable sultones are 1,3-propanesultone, 1,3-butanesultone, 1,4-butanesultone, 1,3-pentanesultone, 1,4-pentanesultone, 1,4-hexanesultone and 1,6-hexanesultone. The sultones are generally used in stoichiometric amounts with reference to the alkenoic acid salts, but they may be used in excess, for example in an excess of up to twice.

The reaction is carried out in the presence of an alcohol, preferably an alkanol having one to six carbon atoms. Examples of suitable alcohols are: ethanol, n-butanol, isobutanol, tert-butanol, cyclohexanol, propanol and particularly methanol. The alcohols are used as a rule in an amount of 3 to 12 moles per mole of alkenoic acid salt. The reaction is carried out at a temperature of less than 45° C, preferably less than 40° C, particularly at from 20° to 40° C, at atmospheric or superatmospheric pressure, continuously or batchwise.

For example the starting materials may be reacted with one another as follows: a mixture of a salt of an alkenoic acid and an alcohol, or of alkenoic acid, alkali metal alcoholate and, if desired, alcohol, is brought to the reaction temperature. Depending on the solubility of the alkenoate, the mixture is then present as a solution or contains undissolved salt. The sultone is then added in the course of fifteen to forty-five minutes and the mixture is cooled to −5° to −30° C; the end product which has crystallized out is separated by filtration.

Compounds which can be prepared by the process according to the invention are valuable starting materials for the production of fibers, detergents, wetting agents, dispersing agents, ion exchangers and plastics. For example they may serve as comonomers for the production of polyacrylonitrile fibers which are to be dyed with basic dyes. The publications mentioned above are referred to for further uses.

The invention is illustrated by the following Examples. The parts set out in the following Examples are parts by weight.

EXAMPLE 1

345 parts of methacrylic acid is slowly added at a temperature of 10° to 20° C to a solution of 216 parts of sodium methylate in 700 parts of methanol, the salt of the carboxylic acid thus being precipitated. The mixture is then heated to 40° C and at from 40° to 45° C 488 parts of 1,3-propanesultone is added. The sodium methacrylate first precipitated passes into solution during the addition of the sultone. When the mixture is cooled to −5° C, sodium methacryloxypropanesulfonate crystallizes out in great purity. 735 parts of this substance is obtained (80 percent of the theory).

The end product has the following analytical data after having been dried: molecular weight: 210

| Calculated: | Found: |
|---|---|
| C 36.5% | C 36.5% |
| H 4.78% | H 5.1% |
| O 34.8% | O 34.8% |
| S 13.9% | S 13.8% |
| Na 10.0% | Na 10.1% |

In chromatography of the end product on a cellulose-coated glass sheet with the developing solvent alcohol:water:concentrated ammonia 80:16:4, the end product is shown to be homogeneous (Rf value = 0.75).

EXAMPLE 2

114 parts of lithium methylate is added to 216 parts of acrylic acid dissolved in 400 parts of methanol. The mixture is heated to 40° C. 366 parts of 1,3-propanesultone is added in portions in the course of 30 minutes and the mixture is stirred for another two hours at this temperature. 800 parts of acetone is then added and the whole is cooled to −20° C. The deposited crystalline solid is suction filtered and dried. 437 parts (73 percent of the theory) of the lithium salt of γ-acryloxypropanesulfonic acid is obtained. The end product has the following analytical values: molecular weight: 214:

Calculated: O 40.0%   S 16.0%   Li 3.5%
Found: 39.8%          16.1%        3.5%

We claim:

1. A process for the production of an ω-hydroxyalkane-sulfonic/alkenoic acid ester which comprises reacting an alkali metal or alkaline earth metal salt of an alkenoic acid which is a monocarboxylic or dicarboxylic acid of three to six carbon atoms with an alkanesultone of three to six carbon atoms in a solvent reaction medium consisting essentially of an alkanol of one to six carbon atoms and at a temperature of less than 45° C.

2. A process as claimed in claim 1 wherein said reaction is carried out with said alkenoic acid and the alkali metal or alkaline earth metal alcoholate of said alkanol such that at least part of the alkanol solvent is formed during the reaction of said acid with said alcoholate.

3. A process as claimed in claim 1 wherein the alkali or alkaline earth metal of said salt is selected from the group consisting of sodium, potassium, lithium, calcium and magnesium.

4. A process as claimed in claim 1 wherein alkenoic acid is selected from the group consisting of acrylic acid and methacrylic acid.

5. A process as claimed in claim 1 carried out with the sultone in an excess of up to twice with reference to the alkenoate.

6. A process as claimed in claim 1 carried out with an alcohol in an amount of three to 12 moles per mole of alkenoate.

7. A process as claimed in claim 1 carried out at a temperature lower than 40° C.

8. A process as claimed in claim 1 carried out at a temperature of from 20° to 40° C.

* * * * *